Patented Jan. 22, 1929.

1,699,580

UNITED STATES PATENT OFFICE.

WILLIAM ALEXANDER FELIX BLEECK, OF SOUTH BRISBANE, QUEENSLAND, AUSTRALIA.

PRIMARY BATTERY.

No Drawing. Application filed November 4, 1925, Serial No. 66,867, and in Australia February 23, 1925.

This invention relates to primary batteries of the type described in my Letters Patent of the United States of America Number 899,823 of 1908 and Number 1,021,859 of 1912, wherein are described primary batteries which give an exceptionally high electromotive force with a low internal resistance, and which possess a remarkable constancy that enables them to be employed with advantage in many cases where the ordinary primary batteries are unsuitable. The object of this invention is the production of a primary battery not only embodying these important features but in which the hitherto uncontrollable and detrimental diffusion of the excitant through the porous pot into the depolarizer is retarded and the electrical efficiency and ampere hour capacity of the battery is greatly increased under all loads. This factor also considerably lengthens its life and usefulness when the battery is used for intermittent working over an extended period. The improved battery is particularly useful for wireless sending and receiving sets, sparking on motor cars and boats, driving small voltage electric motors, electric lighting, and in other instances where it is desired to obtain a high efficiency at short notice and without having to send the battery, as in the case of secondary batteries, to charging stations.

In carrying out my invention I use the same elements as described and claimed in Patent Number 899,823 hereinbefore referred to, namely, a perforated rectangular or cylindrical carbon element placed in the depolarizer contained in an outer containing vessel made of glass, celluloid, or other suitable material, and zinc element, preferably in the form of a perforated cleft rectangular or cylindrical tube (although I do not wish to bind myself to any particular form or shape of such element) placed in the excitant, which is contained in a porous pot within the carbon element.

The depolarizer, which is the same as described and claimed in Patent Number 1,021,859, to which reference has been made, consists of the following ingredients mixed in approximately the following proportions:—

Chromic acid _____ eight (8) ounces.
Water _____ fifteen (15) ounces.
Hydrochloric acid _____ five (5) ounces.
Ferrous sulphate or nickel sulphate or
  a mixture of the two _____ one (1) ounce.

The commercial hydrochloric acid is mixed with the water, and, in this mixture, the ferrous sulphate or nickel sulphate or a mixture of ferrous and nickel sulphate in any proportion is disssolved, and then commercial chromic acid is subsequently added to the solution.

The excitant consists of a solution of sodium hydroxide formed of approximately eight (8) ounces of sodium hydroxide dissolved in approximately sixteen (16) ounces of water, as included in my Patent Number 899,823, but, instead of adding gum arabic, as in Patent Number 1,021,859, for retarding the diffusion of the excitant, I add approximately two (2) fluid ounces of sodium silicate. The sodium silicate is used as a colloidal substance in solution, which not only retards the diffusion of the excitant but thereby greatly improves the electrical efficiency of the battery. The cell or battery may be fully charged within two minutes and is then immediately ready for use, recording the exceptionally high electro-motive force of 2.6 to 2.7 volts per single cell.

I do not wish to bind myself down to the proportions hereinbefore set out, as I find that good results are obtainable even when a more or less wide departure is made therefrom.

Having now particularly described and ascertained the nature of my said invention and in what manner the same is to be performed, I declare that what I claim is:—

1. In improvements in primary batteries of the double fluid type, an excitant consisting of a solution of sodium hydroxide to which sodium silicate is added, the resulting solution being fluid, substantially in the proportions and for the purposes set forth.

2. In improvements in primary batteries of the double fluid type, a depolarizer consisting of a mixture substantially in the proportions mentioned of chromic acid, water, and hydrochloric acid, together with ferrous or nickel sulphate or a mixture thereof, and an excitant consisting of a fluid mixture substantially in the proportions set forth of sodium hydroxide, water, and sodium silicate, as and for the purposes set forth.

3. A primary battery of the double fluid type consisting of zinc as the positive element in an excitant consisting of a solution of sodium hydroxide to which sodium silicate has been added the resulting solution being fluid, and carbon as the negative element in a depolarizer consisting of a mixture of chromic acid, water, and hydrochloric acid, together with ferrous or nickel sulphate or a mixture thereof, the depolarizer being separated from the excitant by a porous partition as herein described.

In testimony whereof I affix my signature.

WILLIAM ALEXANDER FELIX BLEECK.